Figure 1:
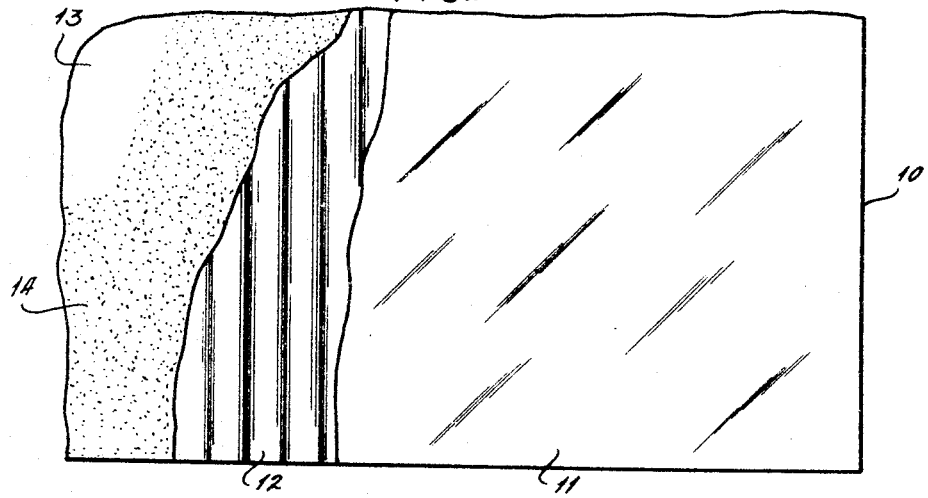

Feb. 28, 1961

E. J. RODGERS, JR 2,973,295

PROCESS OF INCORPORATING FOAMABLE MATERIALS
IN CORRUGATED PAPERBOARD AND THE
ARTICLE DERIVED THEREFROM

Filed May 8, 1957

INVENTOR:
ELLIS J. RODGERS, JR.

By William Nye

ATTORNEYS.

United States Patent Office 2,973,295
Patented Feb. 28, 1961

2,973,295
PROCESS OF INCORPORATING FOAMABLE MATERIALS IN CORRUGATED PAPERBOARD AND THE ARTICLE DERIVED THEREFROM

Ellis J. Rodgers, Jr., Oakland, Calif., assignor to Crown Zellerbach Corporation, San Francisco, Calif., a corporation of Nevada Filed May 8, 1957, Ser. No. 657,788

2 Claims. (Cl. 154—100)

This invention relates to a novel article from corrugated paperboard by new processes of incorporating foamed material in the voids between the flutes of corrugated medium.

More particularly the invention comprises new and novel processes of incorporating mechanical and chemical foams into some, one-half or all of the voids between the flutes of corrugated paperboard and the new article of manufacture thus formed.

Corrugated board is used primarily in the packaging field to provide an easily handled and stacked container for protecting a wide variety of products from damage during storage, handling and in shipment. Corrugated board as currently made is not resistant to crushing and column loading at high humidities nor is the board capable of regaining its original protective nature after it becomes distorted or crushed under high conditions of humidity. For this reason corrugated containers are used with difficulty in packaging such items as fish, meat, iced or wet produce, or even such durable manufactured items as refrigerators and other appliances when they are stacked under high humidity conditions, thus limiting their service storage.

Many attempts to provide corrugated board with high top load and crush resistance under high humidity conditions are recorded in the literature. In all of these methods the corrugating medium is impregnated by saturation or coating with resin, sulphur or other water-resistant compositions to provide resistance to water or water-vapor. However, none of these processes has provided sufficient improvement in these characteristics to warrant their use because of the problems they create on the corrugator. They adhere to the liners with difficulty, and often give poor flute formation due to the embrittlement of the medium by the treatment. Among the best results that have been achieved is by using a Piccopale hot melt coating process on the medium but this has been found to give only about 20% increase in dry strength and little change in the percent of wet strength retained when the treated board is subjected to high, for example, 85% relative humidity. This process also requires special adhesives.

I have discovered that the incorporation of soft, semi-rigid, or rigid open or closed foams in the voids between the flutes of corrugated board will form a product exhibiting superior dry strength and much superior resistance to crushing and top load at high humidities when compared with the normal corrugated board now used in the container field. The foam also provides an insulated barrier and cushioning to repeated impact which are not obtainable from normal corrugated board.

The invention therefore comprises new and novel processes for incorporating chemically or mechanically foamable material between one-half or all of the voids between the flutes in corrugated paperboard to form a new article of manufacture having superior dry and wet strength combined with insulating and cushioning properties.

A preferred material for my invention is a polyurethane resin which foams chemically in the presence of a catalyst and because of such characteristics as foaming in situ at room temperature, its adhesive properties and its mild pressure requirements make it adaptable to present corrugating equipment.

I have also found that it is possible to compound foamable polymers which can be incorporated into voids of corrugated board and subsequently foamed under heat and pressure to produce a similar product. These include polymers or copolymers of thermosetting or thermoplastic nature which can be compounded to form foams and include such materials as polyethylene, polystyrene, polyvinyl chloride, copolymers of acrylonitrile, phenolic resins, polyesters and the like, which can be chemically or mechanically foamed.

A primary object of the invention is to provide novel processes of incorporating chemically or mechanically foamable copolymers of thermosetting or thermoplastic characteristics in the voids between the flutes of corrugated paperboard, foaming the materials in situ whereby at least half of the voids between the flutes of the corrugated medium become filled with foam and a substantially improved crush and top load resistance under both normal and high conditions of relative humidity are imparted to the corrugated paperboard.

Another object of the invention is to provide a new article of manufacture by a novel process of applying to a liner board chemically foamable resins of a thermoplastic nature selected from classes of polymerization products such as polystyrene, polyvinyl chloride or copolymers of acrylonitrile, attaching a corrugated sheet to the liner board and filling the voids between the flutes by foaming the resins by blowing agents, heat, pressure or mechanical means.

Still another object of the invention is to provide a new and useful article from corrugated fibreboard by a novel process of forming a mixture of a diisocyanate, a castor oil or a polyester, or mixture of the two latter components in conjunction with a suitable catalyst, applying the mixture to the inner face of a liner board, attaching a sheet of single faced corrugated board to the liner, whereby the resulting polyurethane foams in situ to fill one-half of the voids between the flutes of the corrugated board.

A still further object is to provide a new article of manufacture from corrugated fibreboard by a novel process of forming an adhesive mixture of a diisocyanate and castor oil, a polyester or a polyether in conjunction with a suitable catalyst, for instance a tertiary amine such as N-alkyl morpholine or diethylethanolamine applying the combination to the inner faces of an inner and outer liner, attaching the liners to a corrugated medium, whereby the polyurethane foams in situ to fill some, one half or all of the voids between the flutes of the double faced corrugated fibreboard.

Another object is to provide a new article of manufacture comprising two parallel sheets of flexible material such as for example, paperboard liners with an adhesive foamable material foamed in situ therebetween.

Following is an example of a preferred process for forming the new article of manufacture wherein one-half of the voids between the flutes of the corrugated medium are filled with a semi-rigid foam having a density of about two pounds per cubic foot.

EXAMPLE 1

Step 1

| | Parts by weight |
|---|---|
| Castor oil based urethane polymers | 100 |

This is a commercially available mixture obtainable from E. I. du Pont de Nemours & Company comprising a mixture of the following:

- 85 parts by weight of castor oil
- 15 parts by weight of polyethylene glycol 200
- 100 parts by weight of tolyene-diisocyanate (containing 80% 2,4-isomer and 20% 2,6-isomer)

Viscosity of mixture approximately 1000 poises

The urethane is heated to 70° C. and thereafter cooled to 25°–30° C.

Step 2

| | Parts by weight |
|---|---|
| A buffered catalyst | 6.8 |

This is commercially available from E. I. du Pont de Nemours and Company comprising:

- 24 parts by weight 35% hydrochloric acid
- 42 parts by weight diethyl ethanolamine
- 34 parts by weight water The catalyst is added to step 1 and the two components thoroughly mixed for 30 to 40 seconds until about the consistency of whipped cream.

Step 3

A coating of this mixture, equivalent to about 50 pounds to 1 M sq. ft. of liner was applied to an 8½ x 11" sample of 37 pound/M sq. ft. liner, which was then combined without additional adhesive with a similar sized single-faced A-flute corrugated board consisting of 26 pounds/M sq. ft. medium and 42 pounds/M sq. ft. liner.

Step 4

Foaming of the mixture continued for about 12 minutes at room temperature under mild pressure of about 2 p.s.i. The foam was allowed to cure for about 12 hours at room temperature.

The article thus formed had one-half of the voids between the flutes of the corrugated medium filled with foam having a density of about 2 pounds/cu. ft. and in appearance the board presented a flat uniform surface.

Test specimens of the novel corrugated board, circular in cross-section containing 4.91 sq. in. were placed in atmospheres of 73° F. and 50% relative humidity and 73° F. and 95% relative humidity respectively, together with test specimens of corrugated board made with the same materials but without the foamed urethane in the voids.

The specimens were then crushed in a Hinde and Dauch crush tester and the results expressed in p.s.i. required to crush the specimens. These data are summarized in the following table:

TABLE I.—COMPARATIVE CRUSH RESISTANCE OF URETHANE AND NON-URETHANE CONTAINING CORRUGATED BOARD IN LBS./SQ. IN.

| Urethane Containing Board | | Non-Urethane Containing Board | |
|---|---|---|---|
| 73° F. 50% R.H. | 73° F. 95% R.H. | 73° F. 50% R.H. | 73° F. 95% R.H. |
| 43.7 | 24.5 | 14.9 | 10.1 |

Under the high humidity conditions the urethane foam containing corrugated board represents an increase of 242% over the untreated board. Under normal conditions of 50% relative humidity, the urethane foam containing board proved to be 193% more resistant to crushing than the untreated board. In addition, thickness measurements, made as shown in Table II below, indicate that the urethane foam containing board had greater resiliency and will return to almost its original thickness after exposure to 95% relative humidity, while the untreated board is irreparably damaged. Also the urethane foam treated board retained its rigid flexure properties while the untreated board became soft and pliable.

TABLE II.—COMPARATIVE THICKNESS MEASUREMENTS OF CRUSHED AND UNCRUSHED URETHANE TREATED AND UNTREATED CORRUGATED BOARD

| Type Board | Original Thickness, Inches | After Testing | | 12 Hours After Testing | |
|---|---|---|---|---|---|
| | | Thickness, inches | Percent of original | Thickness, inches | Percent of original |
| Urethane Treated | .220 | .140 | 64 | .195 | 89 |
| Untreated | .222 | .128 | 58 | .139 | 63 |

These tests show that the crush under both wet and dry conditions was greatly increased, that the resiliency was increased and that the rigidity was retained after crushing in one set of treated specimens, and these results are attributed to the urethane foam filling one-half of the voids formed by the flutes, since prior to application to the identical second liners, both sets were made from the same single-faced medium having equal strength. These comparative results illustrate the substantial practical value of the invention which has many applications and advantages in the container and light construction fields.

EXAMPLE 2

Step 1

The foamable mixture prepared as described in Example 1 is applied to the liner faces of both liners and the coated liners combined with an A-flute corrugated medium without additional adhesive.

Step 2

Foaming of the mixture continued for about 12 minutes at room temperature under about 2 pounds/sq. in. pressure and the foam allowed to cure for about 12 hours at room temperature.

The new article thus formed has a flat uniform surface with all of the voids between the flutes of the corrugated medium filled with foam having a density of about 2 pounds/cu. ft. The crush resistance is increased over the results obtained from Example 1 and set forth in Table I.

The rate of foaming and the set time for the urethane used in the above Examples 1 and 2 can be increased if the temperature of the urethane polymer is raised to 50° C., a higher concentration of catalyst is used, and the foaming is carried out in an oven at moderately high temperatures.

The urethane catalyst mixture can be applied at the corrugator by using commercially available spraying or coating equipment. The platten dryer of the corrugator would then be used as an oven to increase the rate of foaming and cure. The board can be scored and cut in the conventional manner as soon as foaming has ceased.

EXAMPLE 3

Another formulation which results in a rigid foam containing essentially all closed cells and having a density of about 2 pounds/cu. ft. can be made as follows:

Step 1

| | Parts by weight |
|---|---|
| Selectrofoam 6002 | 60 |

This is the trade name for a polyester resin having a Brookfield viscosity at 25° C. of 46,000 cps., and specific gravity of 1.139 available from the Pittsburgh Plate Glass Company.

The Selectrofoam 6002 is heated to about 40° C.

Step 2

Tween 40 ............................................................. 1

This is the trade name for a surface active agent, Polyoxyethylene sorbitan monopalmitate, having a viscosity of 25° C. of 400–600 cps., and a specific gravity of 1.05–1.10 available from the Atlas Powder Company.

One part is added and thoroughly mixed with the Selectrofoam 6002.

Step 3

Dimethylethanolamine ............................................. 0.25

Is added and thoroughly mixed with the mixture of step 2.

Step 4

Water ................................................................ 30

Is added and thoroughly mixed with the mixture of Step. 3.

Step 5

Selectrofoam 6003 .................................................. 100.0

This is the trade name for a diisocyanate containing component having a Brookfield viscosity at 25° C. of 1730 cps., and a specific gravity of 1.207, available from the Pittsburgh Plate Glass Co.

The Selectrofoam 6003 is added and mixing continued for about 20 seconds before coating the liner or liners in the same manner as described in Examples 1 and 2, to fill either half or all of the flutes as desired.

The setting and foaming reaction of this formulation can be accelerated by the same method used with the castor oil based system.

The accompanying drawing further illustrates the new article of manufacture and like numerals and symbols therein refer to like parts wherever they occur.

Figure 2:
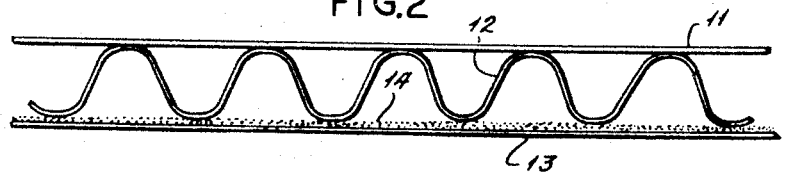
Figure 3:
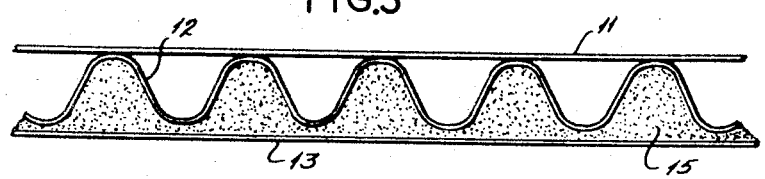
Figure 4:
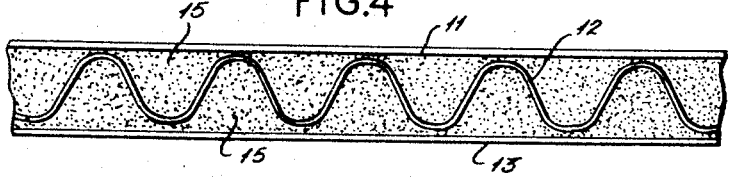

Fig. 1 shows a section of a sheet of double faced corrugated board 10 with the top liner board 11 broken away to show the corrugated medium 12, and the corrugated medium in turn broken away to show the bottom liner 13 with the foam 14 sprayed or coated thereon;

Fig. 2 is an end view of Fig. 1 showing the top liner 11, the corrugated sheet 12, the inner liner 13 with the foamable material 14 sprayed or coated thereon;

Fig. 3 shows the end view of the corrugated sheet of Fig. 1 with the foamable material foamed in situ or in place, filling half of the voids between the corrugated flutes; and Fig. 4 shows the end view of the corrugated sheet of Fig. 1 wherein the foamed material has been placed on both the inner and outer liners 11 and 13.

The strip of corrugated board 10 shown in Fig. 1 has a top liner 11 partially broken away to show the corrugated medium 12 and a portion of the corrugated medium to show the inner liner 13 attached to the corrugated medium. The inner liner is stippled at 14 to show the foamable material sprayed or coated thereon. In the end view of the corrugated board 10, Fig. 2, the inner liner shows the coating 14 of the foamable material in place, the corrugated sheet 12 having been placed upon the foamable material so as to rest upon the surface of said adhesive mixture 14 and out of contact with the bottom sheet 13, while the end view Fig. 3, shows the material 15 foamed to fill half of the voids of the corrugating medium while Fig. 4 shows the corrugated board with inner and outer liners attached to which the foamable material has been coated on the inner face of both sheets, the material foam filling all of the voids between the flutes of the corrugated medium and suspending the corrugated material in spaced relation to the liners.

Other commercially available foams, either chemically or mechanically produced, can be used in a similar manner, although higher temperatures and pressures as well as special equipment such as roller mills and molds are necessary. Following is an example of the use of foam produced from polyvinyl chloride:

EXAMPLE 4

Step 1

A premix of the following is made in a Hobart or equivalent mixer, in the order listed.

Parts by weight

Oil Tribase ........................................................ 5

The trade name for a lead sulfate stabilizer for vinyl chloride obtainable from the National Lead Company.

Antimony oxide ................................................... 10

Surfex ................................................................ 20

A carbonate filler of medium to large particle size obtainable from Diamond Alkali Company.

Hercoflex 150 ...................................................... 45

The trade name for octyl-decyl phthalate, a primary plasticizer having a Brookfield viscosity of 35 cps., at 25° C. and a specific gravity of 0.968 available from Hercules Powder Company.

Pliovic AO ......................................................... 20

The trade name for a vinyl chloride dispersion resin having a vinyl chloride content of 95% and an intrinsic viscosity of 0.87, specific gravity of 1.39 and a bulk density of 21.5 pounds/cu. ft., available from Goodyear Tire and Rubber Company.

Cellogen ............................................................ 7

The trade name for a benzene sulfonyl hydrazide blowing agent added upon complete mixing of the above ingredients which decomposes at temperatures of 304°–313° F., evolving nitrogen gas, available from Naugatuck Chemical Company.

This completes the premix.

Step 2

The following ingredients are mixed in the order listed:

Parts by weight

Pliovic AO ........................................................ 80

Hercoflex 150 ..................................................... 45

Chlorowax .......................................................... 30

The trade name for a chlorinated paraffin obtainable from Diamond Alkali Company.

Mark PL ............................................................. 2

The trade name for a viscosity depressant and stabilizer obtainable from the Argus Chemical Co.

Mark XX ............................................................ 2

The trade name for a general purpose stabilizer obtainable from the Argus Chemical Company.

Step 3

Add the premix of step 1 to mixture of step 2 and thoroughly mix.

This completes the formulation of the foamable mixture.

Step 4

Temperatures of 350°–400° F. are used in fusing and blowing, preferably in single cycles of 1 to 10 minutes.

The liners are coated with the formulated mixture in the same manner as described hereinbefore for the urethane formulations, although the viscosity is higher and therefore more difficult to coat, and the combined board heated for the prescribed period of time under pressure sufficient to contain the foam. The foam produced is relatively soft and has a density of about 20 pounds/cu. ft., special equipment, such as roller mills for premixing are also needed in the formulation of the foam.

EXAMPLE 5

Expandable in-place polystyrene:

Step 1

Polystyrene beads are prefoamed by exposing the beads to heat on a moving belt or disc. The time necessary to prefoam granules to 2 pounds/cu. ft. bulk density is about 20 seconds using a radiant heat source of 4 watts/sq. ft., at a distance of 2½ inches from the granules. To make small batches of prefoamed beads, the beads can be prefoamed in a circulating hot air oven at 250°–275° F., in approximately 2 minutes.

Step 2

The beads are then placed in the voids of the corrugated board with the liner plus a suitable adhesive.

Step 3

The beads, board, liner and adhesive are then placed in a mold. The energy to expand the granules may be hot air or steam. The use of 20–60 p.s.i.g. steam forced directly into the mold cavity is the preferred method for expansion. When hot air is used, a range of 300°–450° F. is used for heating.

Step 4

Before removal from the mold the board is cooled to approximately 203° F., for a 2 pound/cu. ft., density foam, and 158° F., for a 20 pound/cu. ft., density foam.

Tap water or refrigerated water may be used for cooling and the cooling cycle is usually one minute or longer, dependent upon the thickness and density of the film.

The following information in connection with the chemicals mentioned in the specification, viz., Surfex, Oil Tribase, Cellogen, Hercoflex 150, Pliovic AO, Selectrofoam 6002 and Selectrofoam 6003, it is believed will be helpful but it is believed that this information is known generally to those versed in the art.

thane mixtures may vary from about 1 to 10 parts by weight.

For some purposes it may be found desirable and expedient to omit the corrugated medium from the structure and form the foam from the foamable material in situ between the parallel liners.

What I claim is:

1. The process of making foam filled corrugated paperboard which is comprised of two spaced substantially parallel outer sheets, a corrugated inner sheet between said outer sheets, which comprises forming an adhesive foaming mixture comprising 100 parts by weight of a castor oil based urethane polymer containing by weight 85 parts of castor oil, 15 parts of polyethylene glycol and 100 parts of tolylene-diisocyanate containing 80% 2,4-isomer and 20% 2,6-isomer having a viscosity of approximately 1 M poises, heating the urethane polymer to 70° C. and thereafter cooling the same to 25°–30° C., adding to the said urethane polymer 6.8 parts by weight of a buffered catalyst comprising by weight 24 parts of 35% hydrochloric acid, 42 parts of diethyl ethanolamine and 34 parts of water, thoroughly mixing the components for 30 to 40 seconds until the mixture is about the consistency of whipped cream, coating the mixture on the inner face of at least one liner sheet, applying the coated inner face of the said one liner sheet to the peaks of corrugations on one face of the corrugated sheet with said coating being adhesively secured to the peaks and spacing the same from the inner face of said one sheet, permanently adhering the other liner sheet to the other face of the corrugated sheet, and foaming the said mixture in situ with sufficient pressure on the liners to also fill at least the voids between adjacent flutes on said one face of the corrugated sheet with the foamed mixture.

2. A paperboard comprising two spaced parallel outer sheets, a corrugated inner sheet between said outer sheets and having peaks of one series of like corrugations spaced from one of said sheets by a plastic foam adhesive material on the inside of one of said outer sheets providing the said spacing of said one sheet from

| Trade Name | Chemical Formula | Physical Properties |
|---|---|---|
| Surfex | Precipitated $CaCO_3$ (98.43% pure) | Specific gravity, 2.65. pH, 9.7. Average particle size in Microne, 1. |
| Oil Tribase | $3PbO-PbSO_4-H_2O$ | Fine White Powder. Specific Gravity, 7.1. Molecular Weight, 990. |
| Cellogen | pp'oxybis (benzene sulfonyl hydrezide) | A White Crystalline Powder. Specific Gravity, 1.56. Decomposition Range, 151–156° C. |
| Hercoflex 150 | It is a monomeric primary plasticizer manufactured from di-n-octyl n-decyl phthalate n-decyl phthalate alcohol and alcohol and phthalic anhydride. | Boiling Point at 5 mm. of Hg, 241° C. Freezing Point, −30° C. Refractive Index at 25° C., 1.481. Specific Gravity at 25° C., 0.969. Acid Number, 0.10 Max. Saponification Number, 272. |
| Pliovic AO | A copolymer dispersion resin produced by the catalytic emulsion polymerization of vinyl chloride monomer with an unknown co-monomer. | Fusion Temperature, 325° F. Vinyl chloride content, 95%. Specific Gravity, 1.39. Intrinsic Viscosity, 0.87. |
| Selectrofoam 6002 | A high viscosity saturated polyester | Viscosity, 77° F., 270,000–350,000 cps. Brookfield. Hydroxyl No. (−5%), 440. Acid No. (Max.), 1.5. $H_2O$ Content (Percent Max.), 0.15. |
| Selectrofoam 6003 | A reaction product of Selectrofoam 6002 and toluene diisocyanate. | Viscosity, 77° F., 1,000–1,400 cps. Isocyanate equivalent/1,000 gm. of 6003, 0.75–0.80. Equivalent wt./NCO, 127–133 group. |

While the foregoing examples illustrate specific formulations which may be employed in carrying out of the present invention, it will be understood that the proportions of various components used in preparing foamable resinous mixtures may vary to a certain extent. For example, the amounts of diisocyanate may vary from about 20 to about 300 parts by weight per 100 parts by weight of castor oil, polyester, or polyether. Also, the amount of catalyst which is incorporated into polyurethe peaks of said corrugations and permanently adhesively securing the sheet to the corrugations, the plastic foam adhesive material comprising 100 parts by weight of a castor oil based urethane polymer containing by weight 85 parts of castor oil, 15 parts of polyethylene glycol and 100 parts of tolylene-diisocyanate containing 80% 2,4-isomer and 20% 2,6-isomer having a viscosity of approximately 1 M poises, the urethane polymer having been heated to 70° C. and thereafter cooled to 25°–30°

C., there being 6.8 parts by weight of a buffered catalyst which was comprised by weight of 24 parts of 35% hydrochloric acid, 42 parts of diethyl ethanolamine and 34 parts of water added to the urethane polymer, the components having been mixed for 30 to 40 seconds until the mixture was about the consistency of whipped cream, another liner sheet permanently adhered to the peaks of the other face of the corrugated sheet, and the material foamed in situ and filling at least the voids between adjacent flutes on said one face of the corrugated sheet.

References Cited in the file of this patent

UNITED STATES PATENTS

| | | |
|---|---|---|
| 1,158,667 | Fairchild | Nov. 2, 1915 |
| 2,552,641 | Morrison | May 15, 1951 |
| 2,576,073 | Kropa et al. | Nov. 20, 1951 |
| 2,607,104 | Foster | Aug. 19, 1952 |
| 2,744,042 | Pace | May 1, 1956 |

FOREIGN PATENTS

| | | |
|---|---|---|
| 577,705 | Great Britain | May 29, 1946 |
| 723,621 | Great Britain | Feb. 9, 1955 |